United States Patent
Ballantyne et al.

(10) Patent No.: US 9,301,177 B2
(45) Date of Patent: Mar. 29, 2016

(54) METHOD AND SYSTEM TO IMPROVE ANTENNA TUNER RELIABILITY

(71) Applicant: Google Technology Holdings LLC, Mountain View, CA (US)

(72) Inventors: Wayne W. Ballantyne, Coconut Creek, FL (US); Armin W. Klomsdorf, Chicago, IL (US); David H. Minasi, Fort Lauderdale, FL (US); Robert S. Trocke, Caledonia, WI (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/226,041

(22) Filed: Mar. 26, 2014

(65) Prior Publication Data
US 2015/0171919 A1    Jun. 18, 2015

Related U.S. Application Data

(60) Provisional application No. 61/917,514, filed on Dec. 18, 2013.

(51) Int. Cl.
| | |
|---|---|
| *H04B 1/18* | (2006.01) |
| *H04W 24/08* | (2009.01) |
| *H04W 24/10* | (2009.01) |
| *H04B 1/26* | (2006.01) |
| *H04B 17/11* | (2015.01) |
| *H04B 17/26* | (2015.01) |

(52) U.S. Cl.
CPC .............. *H04W 24/08* (2013.01); *H04W 24/10* (2013.01); *H04B 17/11* (2015.01); *H04B 17/26* (2015.01)

(58) Field of Classification Search
CPC ............... H03J 3/185; H03J 3/20; H03J 3/22; H03J 3/30; H03J 3/32; H01Q 7/005; H03H 2/005
USPC ............................................ 455/193.1–193.3
See application file for complete search history.

(56) References Cited

U.S. PATENT DOCUMENTS

| | | | |
|---|---|---|---|
| 6,674,291 | B1 | 1/2004 | Barber et al. |
| 7,839,201 | B2 | 11/2010 | Jacobson |

(Continued)

FOREIGN PATENT DOCUMENTS

| | | |
|---|---|---|
| EP | 2255443 B1 | 11/2012 |
| WO | 2006046192 A1 | 5/2006 |

*Primary Examiner* — Lee Nguyen
(74) *Attorney, Agent, or Firm* — Wolfe-SBMC

(57) ABSTRACT

A method and system performs antenna tuning which enhances radio frequency (RF) tuner reliability within a wireless communication device (WCD). The WCD, in response to receiving a request to change an active RF tuning state, retrieves component usage data corresponding to components of a tuning circuit that is tunable to an RF operating channel. The WCD selectively determines, using device environment state data and/or RF state data and the component usage data, an RF tuning state tuned to the RF operating channel. The selected RF tuning state (a) satisfies tuning performance specifications and (b) enhances component reliability performance by minimizing an operational wear on tuning circuit components. The WCD configures the tuning circuit using the selected RF tuning state and tracks session parameter values for tuning circuit components during a corresponding communication session. Following completion of the communication session, the WCD uses the tracked session parameter values to update component usage data.

30 Claims, 9 Drawing Sheets

(56) References Cited

U.S. PATENT DOCUMENTS

| | | |
|---|---|---|
| 8,098,120 B2 | 1/2012 | Steeneken et al. |
| 8,204,446 B2 | 6/2012 | Scheer et al. |
| 8,259,431 B2 | 9/2012 | Katta |
| 8,319,393 B2 | 11/2012 | DeReus |
| 8,460,961 B2 | 6/2013 | Guo et al. |
| 8,611,829 B2 | 12/2013 | Alberth et al. |
| 8,712,340 B2 * | 4/2014 | Hoirup et al. .................... 455/77 |
| 2011/0176252 A1 | 7/2011 | DeReus |
| 2011/0250852 A1 * | 10/2011 | Greene .......................... 455/73 |
| 2012/0214421 A1 | 8/2012 | Hoirup et al. |
| 2014/0273882 A1 * | 9/2014 | Asrani et al. .................... 455/73 |

* cited by examiner

| $r_{21}$ | $(S/N)_2$ | BRANCH 2 DE-TUNING | COMPOSITE S/N (DB) |
|---|---|---|---|
| 1 | 6 DB | 0 DB | 9.0 |
| 0.71 | 3 DB | 0 DB | 7.76 |
| 0.71 | 3 DB | -3 DB | 6.97 |
| 0.5 | 0 DB | 0 DB | 6.97 |
| 0.5 | 0 DB | -6 DB | 6.26 |

METHOD AND SYSTEM TO IMPROVE ANTENNA TUNER RELIABILITY

BACKGROUND

1. Technical Field

The present disclosure relates in general to wireless communication devices and in particular to radio frequency (RF) tuning in wireless communication devices.

2. Description of the Related Art

Traditional voltage-tunable tuning circuit components such as Barium Strontium Titanate (BST) components operate utilizing a bias voltage which can be as high as 20V or more. Long-term operation of these tuning circuit components at higher voltages, combined with higher temperatures, can degrade tuner component reliability. In some cases, BST component reliability can be impaired especially for heavy communication usage of corresponding wireless communication devices, such as smart-phones. This heavy usage results from device users who actively use RF data and voice communication services for several hours a day, especially at elevated temperatures. The reliability impairments at higher temperatures and operating voltages are not unique to BSTs. Most semiconductors and other related components experience some level of degradation. However, the degree of such degradation is material-specific.

Micro-electro-mechanical systems (MEMs) tuners also face component reliability challenges. MEMs tuners employ an array of small capacitor elements. Each element is usually in the form of an arm or beam shape that can be moved to bring the two plates of a capacitor closer together or farther apart. Many elements are electrically combined to form a variable capacitor. The capacitance of the overall device is varied by controlling the number of elements that are in the low or high capacitance state.

For MEMs tuners, one of the primary types of failure is mechanical failure of the materials or structures of individual tuning circuit components. The cause of this mechanical failure is associated with the number of actuation cycles (changing position from low to high capacitance or high to low capacitance) occurring within a tuning circuit component. For mobile devices which are typically always powered on to receive service, billions of actuations over the life of a MEMS tuner are likely to occur. A tuner providing a receive antenna match can accumulate as many as 1 billion cycles per year under normal daily device use. This normal daily use includes an idle mode operation, in which the device is powered on and periodically monitors a wireless paging channel and measures neighbor cell power, as well as a connected (or "active") mode, where the user is in an active data or voice session. In the worst case, the state of some tuning circuit components may change for a majority of those paging and measurement events while other tuning circuit components rarely change state.

BRIEF DESCRIPTION OF THE DRAWINGS

The described embodiments are to be read in conjunction with the accompanying drawings, wherein:

FIG. 4 is a table showing relative levels of signal-to-noise ratios (S/N) for a first and second receive branches and the impact of RF detuning that is applied to the second branch on a composite S/N for the received base-band signal of a diversity receiver configuration, according to one embodiment;

DETAILED DESCRIPTION

Figure 1:
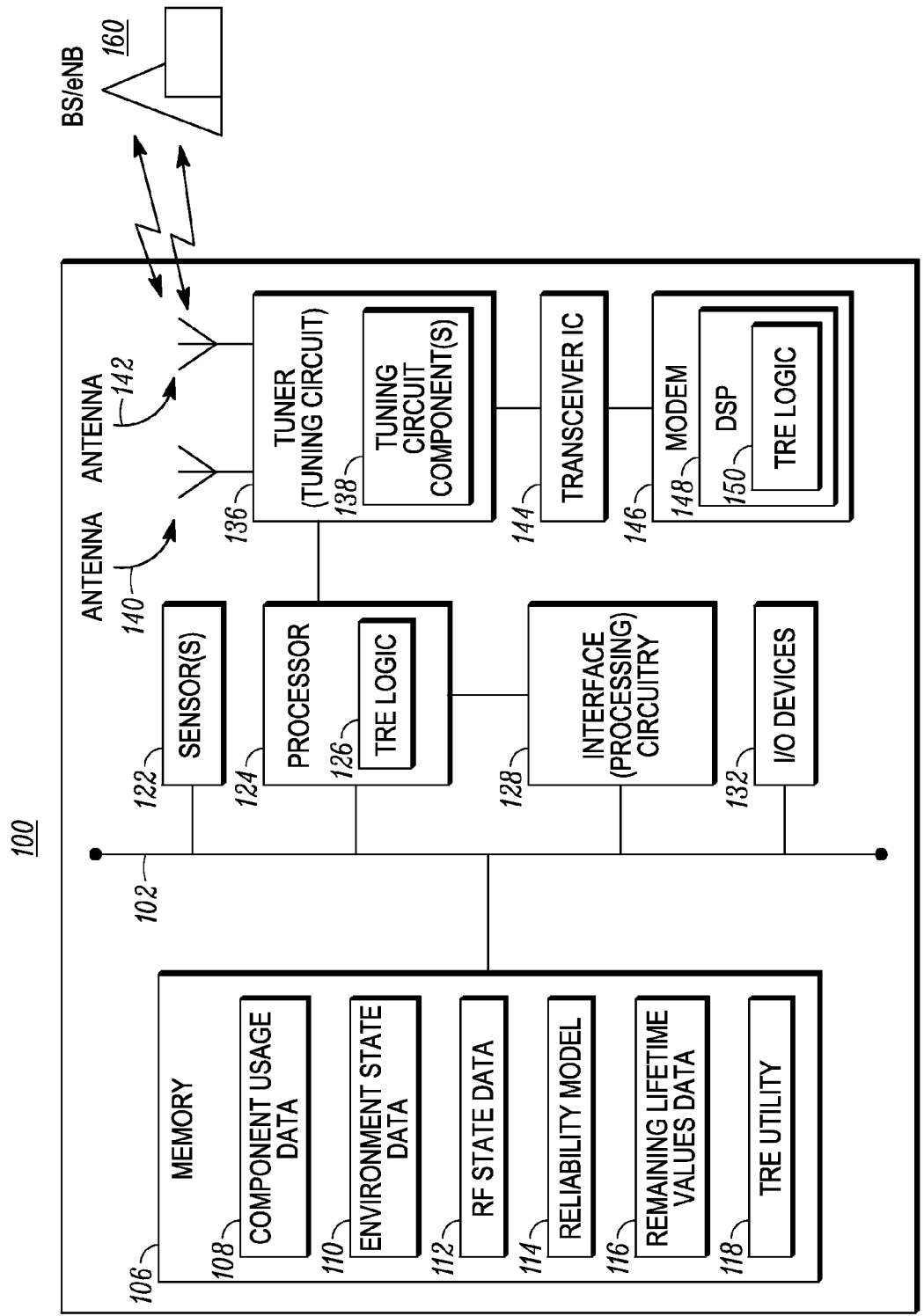
FIG. 1 is a block diagram of an example wireless communication device, communicating with a wireless network, within which the functional aspects of the described embodiments may be implemented.

The illustrative embodiments provide a method and system for performing antenna tuning which enhances radio frequency (RF) tuner reliability within a wireless communication device (WCD). The WCD, in response to receiving a request to change an active RF state, retrieves component usage data corresponding to components of a tuning circuit that is tunable to a first RF operating channel. The WCD selectively determines, using device environment state data and/or RF state data and the component usage data, an RF tuning state tuned to the first RF operating channel. The selected RF tuning state (a) satisfies tuning performance specifications and (b) enhances component reliability performance by minimizing an operational wear on tuning circuit components, or provides an acceptable level of wear during the anticipated RF session. The WCD configures the tuning circuit using the selected RF tuning state and tracks session parameter values for tuning circuit components during a corresponding communication session. Following completion of the communication session, the WCD uses the tracked session parameter values to update component usage data.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

With specific reference now to FIG. 1, there is depicted a block diagram of an example wireless communication device, operating in a Wireless Wide Area Network (WWAN), within which the functional aspects of the described embodiments may be implemented. Wireless communication device (WCD) 100 represents a device that is adapted to transmit and receive electromagnetic signals over an air interface via uplink and/or downlink channels between the wireless communication device 100 and communication network equipment (e.g., base-station 160) utilizing at least one communication standard, such as Global System for Mobile Communications (GSM), Code Division Multiple Access (CDMA), Orthogonal Frequency Division Multiple Access (OFDMA), Universal Mobile Telecommunications Service (UMTS), Long Term Evolution (LTE), Wireless Local Area Networks (WLAN) (e.g. Wi-Fi) and other wireless communication systems. In one or more embodiments, the wireless communication device can be a mobile cellular device/phone or smartphone, or laptop, netbook or tablet computing device, or other types of communications devices.

Wireless communication device 100 comprises processor 124 and interface circuitry 128, which are connected to memory component 106 via signal bus 102. Wireless communication device 100 also comprises sensor(s) 122. In one embodiment, sensor(s) 122 is used to measure temperature(s) of RF circuit components, including tuning circuit components. In addition, wireless communication device 100 comprises input/output (I/O) devices 132. Also included within wireless communication device 100 are radio frequency (RF) tuner (tuning circuit) 136, transceiver integrated circuit (IC) 144 which is communicatively coupled to tuning circuit 136, and modem 146 which is communicatively coupled to transceiver IC 144. In one embodiment, modem 146 includes digital signal processor (DSP) 148. In one implementation, firmware of DSP 148 includes tuner reliability enhancement (TRE) logic 150. As illustrated within WCD 100, tuning circuit 136 comprises tuning circuit components 138.

In at least some embodiments, the sending and receiving of RF communication signals occur wirelessly and are facilitated by one or more antennas/antenna elements 140 and 142 communicatively coupled to tuning circuit 136. The number of antenna elements can vary from device to device, ranging from one or more antenna elements and the presentation within wireless communication device 100 of a particular number (e.g., N) of antenna elements is merely for illustration.

Wireless communication device 100 is able to wirelessly communicate with one or more base-stations including base-station 160 via one or more antennas (e.g., antennas 140, 142). Each of the one or more base-stations (e.g., base station 160) can be any one of a number of different types of network stations and/or antennas associated with the infrastructure of the wireless network and configured to support uplink and downlink communication via one or more of the wireless communication protocols supported by a respective wireless network core, as known by those skilled in the art.

In addition to the above described hardware components of wireless communication device 100, various features of the invention may be completed or supported via software or firmware code and/or logic stored within at least one of memory 106 and respectively executed by DSP 148 or processor 124. Thus, for example, included within system memory 106 is a number of software, firmware, logic components, modules, or data, including component usage data 108, environment state data 110, RF state data 112 and reliability model 114. In addition, system memory 106 comprises remaining lifetime values data 116 and tuner reliability enhancement (TRE) utility 118. TRE utility 118 is executed on processor 124 to provide TRE logic 126. In one implementation, TRE logic 150 is included within DSP 148.

The various components within wireless communication device 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media which can include optical interconnects, or may be indirect interconnections that include one or more intermediate electrical components. Although certain direct interconnections are illustrated in FIG. 1, it is to be understood that more, fewer or different interconnections may be present in other embodiments.

Figure 2:
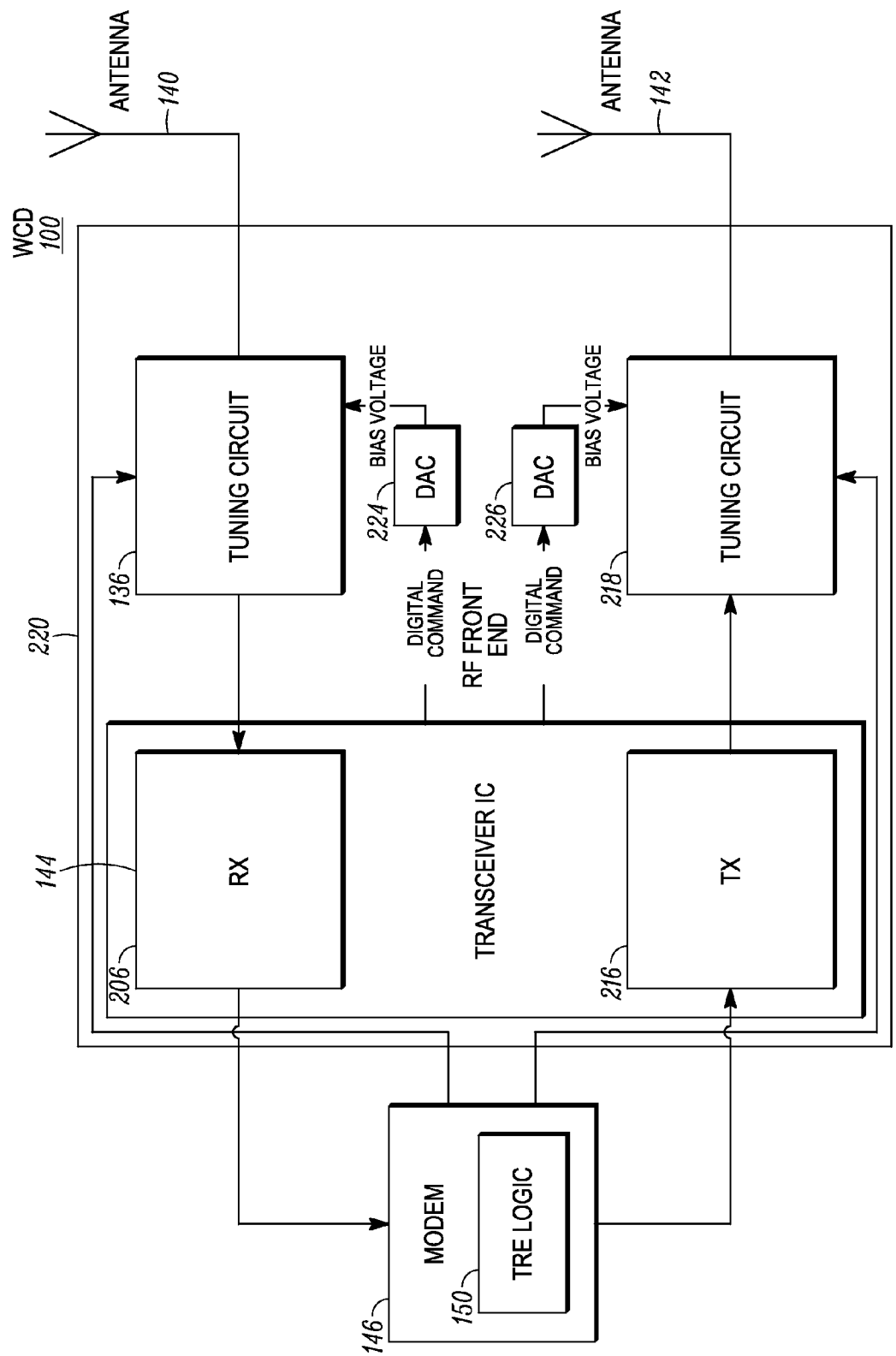
FIG. 2 is a block diagram of an example wireless communication device having a modem and radio frequency components, including at least one tuning circuit, according to one embodiment.

FIG. 2 is block diagram of an example wireless communication device having a modem and radio frequency components including at least one tuning circuit, according to one embodiment. Wireless communication device (WCD) 100 comprises modem 146 and radio frequency front end (RFFE) module 220, which is communicatively coupled to modem 146. In addition, WCD 100 comprises first antenna 140 and second antenna 142 which are both coupled to RFFE module 220. RFFE module 220 comprises transceiver IC 144 which includes a number of components within an RF receive signal path and RF transmit signal path, which components include receiver (RX) 206 and transmitter (TX) 216. RFFE module 220 also includes first tuning circuit 136 which is communicatively coupled to an input port of RX 206 within the RF receive signal path. Also illustrated within RFFE 220 is digital-to-analog converter (DAC) 224 which receives an input signal specifying a specific source voltage, possibly in the form of a digital programming command containing a desired DAC output value. DAC 224 yields a corresponding bias voltage signal which is applied to tuning circuit 136. Additionally, RFFE module 220 includes second tuning circuit 218 which is communicatively coupled to an output port of TX 216 within the RF transmit signal path. Also illustrated within RFFE 220 is digital-to-analog converter (DAC) 226 which receives an input signal specifying a specific source voltage, possibly in the form of a digital programming command containing a desired DAC output value. DAC 226 yields a corresponding bias voltage signal which is applied to tuning circuit 218. First tuning circuit 136 comprises tuning circuit components 138 (FIG. 1) which can include variable capacitors such as voltage tunable capacitors (e.g., BST tuning circuit components). In another embodiment, tuning circuit components 138 comprises MEMs tuning circuit components. In one or more related embodiments, second tuning circuit 218 comprises components which are similar to the components of first tuning circuit 136.

Modem 146 is communicatively coupled to both RX 206 and first tuning circuit 136 within the RF receive signal path. In addition, modem 146 is communicatively coupled to both TX 216 and second tuning circuit 218 within the RF transmit signal path. Illustrated within modem 146 is TRE logic 150. As a result, in one embodiment, modem 146 is able to configure first tuning circuit 136 and second tuning circuit 218 with respective RF tuning vectors.

WCD 100 configures a tuning circuit (e.g., first tuning circuit 136) in order to tune to or activate an RF operating frequency channel by using a selected RF tuning state. Specifically, WCD 100 receives a request to change a previously activated or first RF state from base-station 160. In response to receiving the request to change the first RF state, WCD 100 retrieves component usage data 108 corresponding to one or more tuning circuit components 138 of tuning circuit 136 that is tunable to the first RF operating channel. In a first implementation, the tuning circuit components are voltage tunable components including Barium Strontium Titanate (BST) components. In addition, WCD 100 retrieves at least one of (i) device environment state data 110 and (ii) an RF state data 112. The retrieved device environment state data 110 and/or RF state data 112 impacts reliability performance of tuning circuit components when tuning circuit 136 is activated. WCD 100 selectively determines, using the retrieved component usage data 108 and information about the at least one of the device environment state and the RF state, an antenna tuning state for tuning circuit 136 to be properly tuned to the first RF operating channel. The determined antenna tuning state for tuning circuit 136 (a) satisfies tuning performance specifications and (b) enhances component reliability performance by minimizing an operational wear on the one or more tuning circuit components 138. WCD 100 performs antenna tuning to tune to or activate the first RF operating channel using the antenna tuning state that satisfies tuning performance specifications and enhances component reliability performance.

WCD 100 tracks session parameter values associated with activation of tuning circuit components 138. The session parameter values include component usage state information 108 for an active communication session that is supported by a corresponding antenna tuning state. WCD 100 identifies a component reliability model used to determine reliability performance of tuning circuit components. WCD 100 calculates, using the tracked session parameter values and the identified component reliability model, values for component operational wear caused by the communication session for the one or more circuit components 138. WCD 100 also calculates, using the values for component operational wear, values for an accumulated component operational wear for the one or more circuit components 138. Then, using values for accumulated component operational wear, WCD 100 computes an updated expected remaining lifetime value for each of the one or more tuning circuit components 138. WCD 100 stores the updated remaining lifetime value for tuning circuit components 138 within a data structure 116.

The tracked session parameter values include a duration of the communication session and at least one of (a) a temperature profile of a corresponding tuning circuit component for the communication session, (b) a bias voltage of the corresponding tuning circuit component and (c) a humidity of the corresponding tuning circuit component.

In one embodiment, in order to determine the antenna tuning state used to tune to the RF operating channel, WCD 100 identifies parameters associated with an operating channel. The identified parameters are selected from among: (a) modem communication mode parameter indicating whether the modem is in one of an idle state, a dormant state, and a connected state; and (b) a specified bias voltage parameter for respective tuning circuit components. A value of the specified bias voltage parameter is identifiable based on an assigned modem channel.

In one implementation, the modem communication mode parameter is a 1-bit variable which can be used to identify any of two possible states (i.e., 1 for a Connected State, 0 for an Idle State). In a connected state, WCD 100 is configured for the purpose of receiving user data, and WCD 100 assigns a high priority to selecting optimum or high performance tuning values for configuring tuning circuit 136, in order to maximize the RF signal throughput.

Alternatively, in the idle state, WCD 100 is configured to enable the modem to "wake up" periodically to receive a page and other wireless system information. The pages frequently contain information that is not relevant to WCD 100 and is re-transmitted if the page corresponds to a voice call or a data call. Moreover, for a page which is broadcast to multiple devices, the modulation coding scheme (MCS) is kept constant, which frequently enables WCD 100 to have a high signal-to-noise (S/N) margin for a corresponding receive signal path. As a result, in the Idle mode, tuning circuit 136 within the receive signal path can often be detuned without any substantial functional impact detected by the user of WCD 100.

Referring again to the determination of an antenna tuning state, WCD 100 determines whether to select a first high performance antenna tuning state for tuning circuit 136. In one embodiment, the first high performance antenna tuning state can enable tuning circuit 136 to provide an antenna impedance match that minimizes antenna match loss. The determination includes an evaluation incorporating (a) values for the identified parameters, (b) the component usage data and (c) a remaining lifetime value. In response to determining that the first high performance antenna tuning state is selected, WCD 100 initiates antenna tuning using a first set of tuning values that provides a higher performance operation of the tuning circuit. However, in response to determining that a second lower performance antenna tuning state is selected, WCD 100 initiates antenna tuning using a second set of tuning values that provides an acceptable, lower performance operation of the tuning circuit while improving component reliability performance by extending the remaining lifetime of one or more of the tuning circuit components. In one embodiment, WCD 100 prevents an activation of an antenna tuning state configured using the second set of tuning values during at least one restricted interval from among (a) a first interval of wireless channel acquisition and (b) a second interval of neighbor cell monitoring.

In response to determining that the second, lower performance antenna tuning is selected, WCD 100 selects parameter values that minimize an operational wear on tuning circuit components. The selection involves use of one of (a) preset detuning adjustments to high performance antenna tuning values and (b) calculated detuning adjustments to high performance antenna tuning values. The detuning adjustments provide acceptable projected received signal strength. In one embodiment, the detuning is achieved by lowering a bias voltage for a tuner (e.g., tuning circuit 136).

As previously indicated, WCD 100 determines whether to select a first high performance tuning state or a second lower performance tuning state by using the retrieved data, which includes component usage data 108, environment state data 110 and RF state data 112, to evaluate remaining lifetime value 116 for each of corresponding tuning circuit components 138. By using the history of previous communication sessions (e.g., data receiving sessions), WCD 100 determines remaining lifetime value 116 measured in units of time (e.g., number of days) and uses remaining lifetime value to estimate the remaining life of the tuner circuit component. WCD 100 uses, from the component usage data, the biasing voltage and temperature used in the previous communication sessions to determine the remaining lifetime value. WCD 100 further utilizes a component reliability model which incorporates or utilizes all the respective data values to determine remaining lifetime value 118. In one implementation, WCD 100 stores remaining lifetime value 118 in non-volatile memory.

In one implementation, WCD 100 also tracks a value for a number of days that follow an activation date of WCD 100 for communication service on a corresponding wireless communication network. WCD 100 compares the "number of days" value with a threshold service days value (e.g., 4 yrs×365 days). In one embodiment, the threshold number of days is determined from analysis of empirical testing results and can vary depending on the device and other considerations. For example, this threshold value can be a specific value associated with a particular type of device, tuning circuit components, call service capabilities and average usage levels. Average usage levels can also be associated with the particular device type and service capabilities. If the "number of days" value is greater than the threshold service days value, WCD 100 determines whether the remaining lifetime value is greater than a remaining lifetime threshold value. If the remaining lifetime value is greater than the remaining lifetime threshold value, WCD 100 assigns a low priority level to a priority associated with selecting a low performance antenna tuning state and/or a high priority level to a priority associated with selecting a high performance antenna tuning state.

As previously indicated, WCD 100 determines a device usage level for WCD 100. WCD 100 also determines an average operating temperature range and/or an average biasing voltage for activate RF operating channels. In one implementation, sensor data provided by sensor(s) 122 can be used to determine a temperature profile corresponding to active tuning circuit components and to calculate average temperature levels by using the temperature profile. The average biasing voltage of tuning circuit components can be determined from analysis of session usage data identifying bias voltages applied to tuning circuit components during an active communication session. In one embodiment, WCD 100 is able to use the device usage level, an average operating temperature level and/or an average biasing voltage to determine a first projected decrease rate of the remaining lifetime value for a first user relative to a second projected decrease rate of the remaining lifetime value for a second user. For example, with a first WCD operated under "light use" which is defined herein as device operation at a low device usage level, a lower average operating temperature value and/or a lower average biasing voltage, the remaining lifetime value is expected to decrease at a lower rate than for a second WCD operated under "heavy use" which is defined herein as device operation at a high device usage level, a higher average operating temperature value and/or a higher average biasing voltage. In one embodiment, WCD 100 is able to use the "number of days" value and the remaining lifetime value to determine whether WCD 100 is operated under (i) "light use" that establishes communication sessions having a low frequency of occurrences and/or are active for a short duration or (ii) heavy use" that establishes communication sessions having a high frequency of occurrences and/or are active for a longer duration. For example, if the device has already been in service beyond a threshold number of years (e.g., 4 years), and the remaining lifetime value remains at a high value, WCD 100 is able to characterize the device as being operated under "light use". Alternatively, WCD 100 can identify a device as being operated under "heavy use" if the device has a same service period with a low remaining lifetime value. A device operated under "heavy use" will typically have a much shorter lifetime value. By performing RF detuning instead of high performance tuning, within a device (e.g., WCD 100) operated under "heavy use", WCD 100 effectively provides a first lower decrease rate for remaining lifetime value compared with a higher decrease rate (for remaining lifetime value) corresponding to high performance tuning.

In a second implementation, tuning circuit components 138 are electro-mechanical components which are included within micro-electro-mechanical systems (MEMs) tuners or tuning circuits. In this second implementation, in response to receiving the request to change the first RF tuning state, WCD 100 retrieves component usage data 108 corresponding to electro-mechanical tuning circuit components 138. By activating a MEMs tuning circuit, WCD 100 triggers a number of corresponding component actuations. The component usage data corresponding to electro-mechanical components include information indicating an overall count of component actuations associated with changing of RF states over previous communication sessions. Component actuations, which are associated with MEMs tuning circuit components, occur when an RF tuning state is switched to a next, different RF tuning state. While the remaining lifetime value (for voltage tunable components) is significantly impacted by the duration of the communication session, a count of component actuations is primarily impacted by a change to the next RF tuning state. However, reliability of both voltage tunable components and MEMs components may both be affected by the duration of a communication session and changes of RF tuning states. Based on a more significant impact of actuation changes to the reliability of MEMs components, WCD 100 determines whether (a) to perform RF tuning or (b) to avoid performing RF tuning in order to enhance component reliability by avoiding an increase in the count of component actuations. If RF tuning is selected, high performance tuning is performed since component actuations occur as long as a change of RF tuning state takes place and the number of occurring component actuations does not depend on the performance level of the RF tuning provided. Component reliability performance for the electro-mechanical tuning components is improved by minimizing an increase rate of a count of component actuations.

In this second implementation, WCD 100 determines whether (i) to perform RF tuning specifically for the first RF operating channel or (ii) to maintain a previously activated RF tuning state for the first RF operating channel. WCD 100 determines whether to perform antenna tuning or to maintain a previously activated antenna tuning state based on (a) an estimation of an expected RF state of the first RF channel and (b) whether the first RF channel is included within an acceptable range of the RF bandwidth corresponding to RF tuning for the previously activated RF channel. In response to the expected RF state indicating a high RF signal strength, WCD 100 maintains a first tuning state corresponding to a previously activated RF channel in order to improve component reliability in response to the first RF channel being included within the acceptable range of the RF bandwidth corresponding to the previously activated RF channel.

In one embodiment, WCD 100 identifies a trend of the expected RF state corresponding to the first RF channel. In response to the trend of the expected RF state indicating a high RF signal strength and substantially static RF conditions, WCD 100 maintains a first RF tuning state corresponding to a previously activated RF channel in order to improve component reliability.

In one embodiment, WCD 100 uses sensor data to identify an RF state. Specifically, WCD 100 receives sensor data from at least one sensor. The sensor(s) can include an accelerometer, a capacitive touch sensor, and/or a proximity sensor. WCD 100 detects, using the received sensor data, at least one of a movement of the first mobile device and movement of objects near the mobile device. WCD 100 is able to determine the trend of expected signal strength by analyzing the received sensor data and movement associated with the device.

WCD 100 determines/identifies, using the overall count of actuations performed by a tuning circuit component, an estimated remaining lifetime of tuning circuit components to determine whether to change from the first tuning state to the second tuning state. In one implementation, WCD 100 randomly selects, for a communication session, tuning circuit components for activation and to contribute to a specified tuning state that is provided by a subset of tuning circuit components. In one embodiment, WCD 100 uses the identified remaining lifetime values to select, from among functional tuning circuit components within the tuning circuit, a subset of tuning circuit components that are activated to contribute to a total capacitance corresponding to a specified antenna tuning state. WCD 100 distributes an impact caused by component operational wear to remaining lifetime values across tuning circuit components, while configuring specified antenna tuning states by activating different selected subsets of tuning circuit components for various communication sessions.

In one or more aspects of the disclosure, WCD 100 determines, using a device usage level for RF communication activity, whether to maintain the first tuning state, instead of switching to the second tuning state. A high usage level is correlated with a high overall count of component actuations if the second tuning state is activated over corresponding communication sessions. In one or more embodiments, the first tuning state is maintained more frequently for the high usage level than for a low usage level, based on a ratio of the high usage level and a threshold usage level. In other embodiments, usage level is not a factor or is a minimal factor that is used to determine whether a first tuning state is maintained or a switch to second tuning state is performed.

Figure 3:
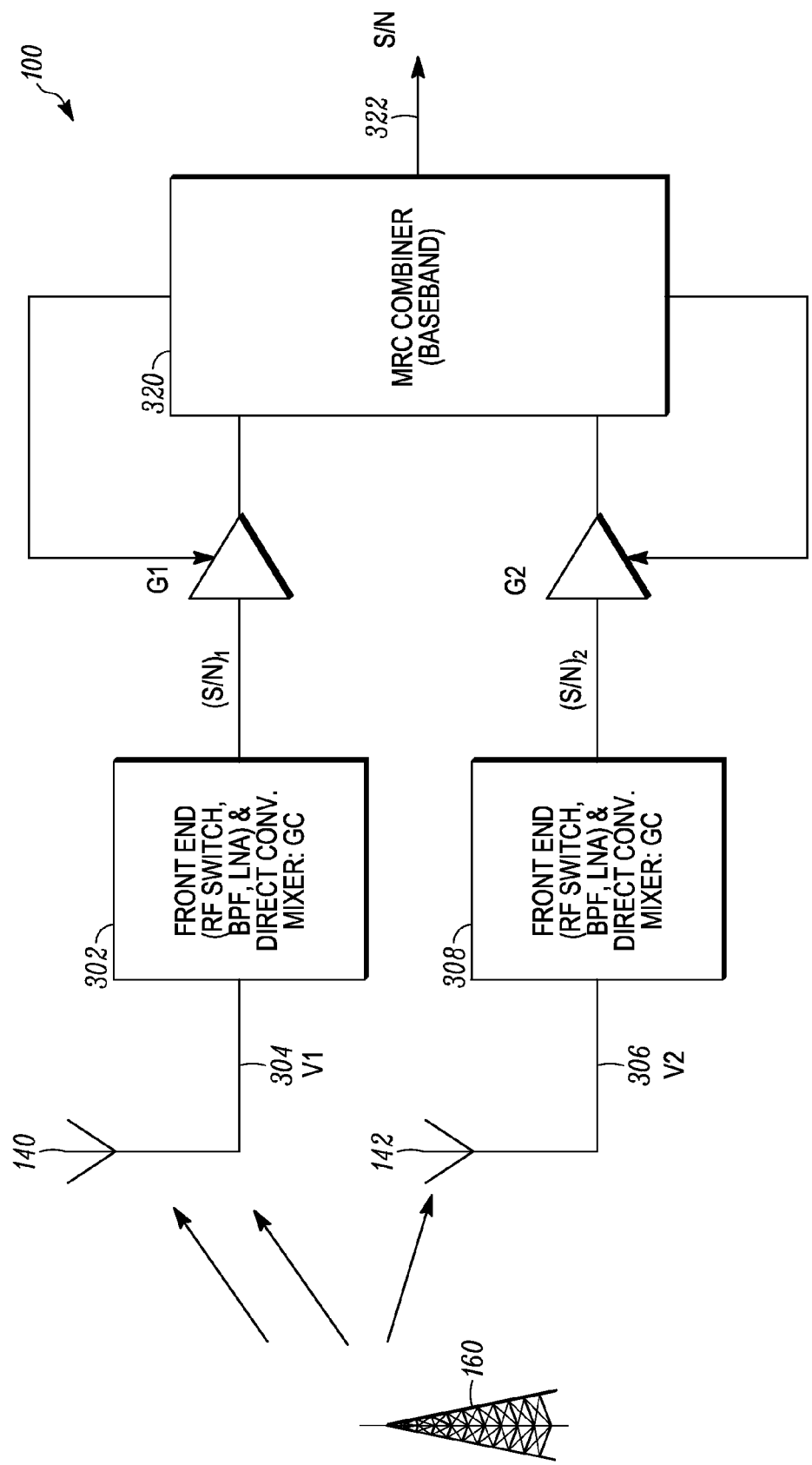
FIG. 3 is a block diagram of an example wireless communication device having a maximal ratio combining (MRC) diversity receiver configuration, according to one embodiment.

FIG. 3 is block diagram of an example wireless communication device having a maximal ratio combining (MRC) diversity receiver configuration, according to one embodiment. In this implementation, WCD 100 comprises first RFFE module 302 and second RFFE module 308. WCD 100 also comprises maximal ratio combining (MRC) baseband receiver 320 which is communicatively coupled to both first RFFE module 302 and second RFFE module 308. As indicated in FIG. 3, each RFFE module comprises a number of RF components including an RF switch and a mixer.

WCD 100 also comprises first receive antenna 140 and second receive antenna 142 which are respectively coupled to first RFFE module 302 and second RFFE module 308. WCD 100 is able to communicate with base-station 160 via first and second antennas 140 and 142. Also illustrated within WCD 100 are voltage signals 304 and 306 having magnitudes $v_1$ and $v_2$, respectively, and which are respectively received via first antenna 140 and second antenna 142. In addition, composite baseband signal 322, when combined with noise, provides an S/N ratio which is illustrated within WCD 100.

As illustrated, WCD 100 comprises a diversity communication configuration having two branches. More generally, a whole number "N" of communication branches larger than "1" can be implemented within a wireless communication device. In one embodiment, WCD 100 identifies high performance tuning vectors for each communication branch from among N communication branches of a diversity receiver configuration, including a first branch initially having a highest signal-to-noise (S/N) ratio and an Nth branch initially having a lowest S/N ratio, prior to an RF tuning adjustment. The branches are identified in an order based on the respective values of the S/N ratios.

WCD 100 then re-calculates RF tuning vectors for up to N−1 of the branches not having the highest S/N by applying, using a ratio of the highest S/N ratio and a respective S/N ratio or another algorithm, an RF detuning adjustment vector to a high performance tuning vector identified for a respective branch. WCD 100 performs (a) RF tuning for the first branch using an identified high performance RF tuning vector corresponding to the first branch and (b) respective RF tuning for up to N−1 of the branches using the RF tuning vectors calculated for each of the $2^{nd}$ to $N^{th}$ branches, to achieve improved reliability for the tuner at the expense of sub-optimal RF performance.

In one embodiment, WCD 100 identifies a first set of branches in which each branch has a respective S/N that differs from the highest S/N by less than a threshold S/N. WCD 100 identifies a second, remaining set of branches in which each branch has a respective S/N that differs from the highest S/N by at least the threshold S/N. Following an assignment of branches to the appropriate sets, WCD 100 performs (a) RF tuning for branches within the first set of branches using the identified high performance RF tuning vectors for corresponding branches and (b) respective RF tuning for branches within the second set of branches using the calculated RF tuning vectors.

The diversity receiver configuration and the application of RF de-tuning adjustments are further described with the aid of table 400 (FIG. 4). FIG. 4 is a table showing relative levels of signal-to-noise ratios (S/N) for a first and second receive branches and the impact of RF detuning that is applied to the second branch on a composite S/N for the received base-band signal of a diversity receiver configuration, according to one embodiment. In the example of FIG. 4, the S/N corresponding to the first branch, and which is illustrated as $(S/N)_1$, is assumed to have a constant value of 6 dB. The first column of table 400 provides values "$r_{21}$" for a ratio of a second received RF signal strength v2 and a first received signal strength v1. The second received RF signal strength v2 corresponds to a second branch, and the first received signal strength v1 corresponds to a first branch. In the first column, the second received signal strength varies over the multiple rows, while the first received signal strength remains constant at 6 dB. The second column of table 400 provides various values of S/N (illustrated as $(S/N)_2$) for the second branch while the first branch has a constant value $(S/N)_1$ (which is not explicitly shown) of 6 dB. The third column of table 400 identifies levels of RF detuning performed for the second branch. High performance RF tuning is always assumed for the first branch of table 400. The fourth column of table 400 identifies composite S/N values corresponding to receive base-band signals. For a 2-branch, diversity receiver configuration, the composite S/N values can be calculated using the following equation:

$$\text{Composite } S/N = (S/N)_1 + 10*\log(1 + r_{21}^2).$$

The composite S/N values indicate the performed RF detuning impact on received base-band signal levels.

First row 402 indicates that "$r_{21}$" is equal to "1" which is consistent with the fact that first row 402 further indicates that $(S/N)_1$ having a value of 6 dB is equal to $(S/N)_2$. First row 402 also indicates that branch detuning is not performed on the second branch. With high performance RF tuning being performed on both branches (where high performance RF tuning is always assumed for the first branch of table 400), first row 402 also indicates that the composite S/N following MRC of receive signals is 9 dB.

Second row 404 and third row 406 both indicate that the second branch has an $(S/N)_2$ value of 3 dB, which is 3 dB less than $(S/N)_1$ of the first branch. As shown in second row 404, no detuning is applied to the second branch and the composite S/N is 7.76 dB. As shown in third row 406, detuning the second branch by −3 dB to improve reliability results in a composite S/N of 6.97 dB, which only reduces the composite S/N of third row 406 relative to the composite S/N of second row 404 by 0.8 dB. In one implementation, detuning is provided by lowering the biasing voltage applied to tuning circuit components. In one or more embodiments, the biasing voltage is lowered by a specified tuning adjustment value.

Fourth row 408 and fifth row 410 both indicate that the second branch has an $(S/N)_2$ value of 0 dB which is 6 dB less than $(S/N)_1$ of the first branch. As shown in fourth row 408, no detuning is applied to the second branch and the composite S/N is 6.97 dB. As shown in fifth row 410, detuning the second branch by −6 dB to improve reliability results in a composite S/N of 6.26 dB, which only reduces the composite S/N of fifth row 410 relative to the composite S/N of fourth row 408 by 0.71 dB.

FIGS. 5-9 are flow charts illustrating embodiments of the method for performing RF tuning to enhance tuning circuit component reliability and by which the above processes of the illustrative embodiments can be implemented. Although the methods illustrated by FIGS. 5-9 may be described with reference to components and functionality illustrated by and described in reference to FIGS. 1-4, it should be understood that this is merely for convenience and alternative components and/or configurations thereof can be employed when implementing the method. Certain portions of the methods may be completed by TRE utility 118 executing on one or more processors (FIG. 1). The executed processes then control specific operations of wireless communication device 100. For simplicity is describing the method, all method processes are described from the perspective TRE utility 118 and wireless communication device 100.

Figure 5:
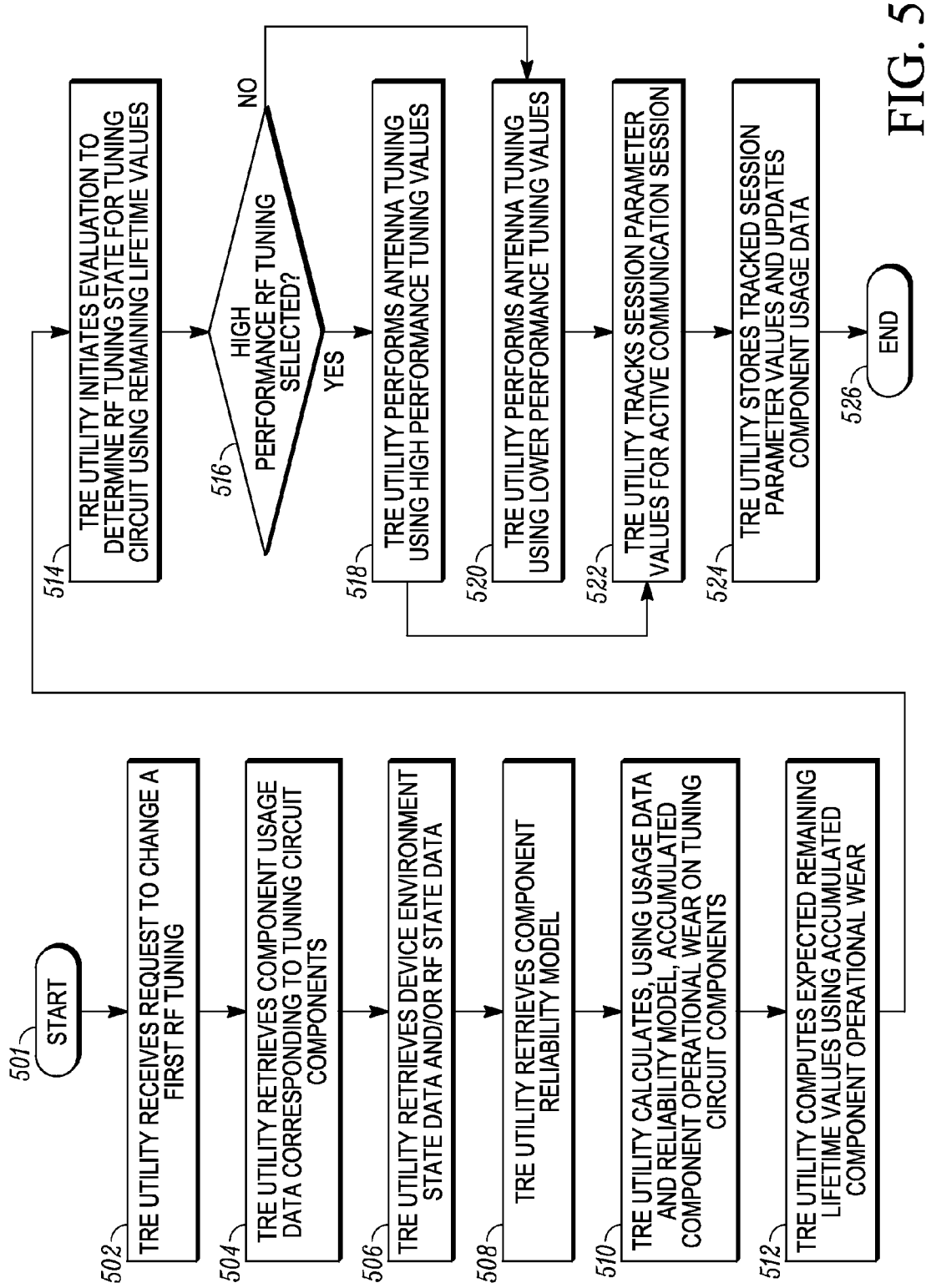
FIG. 5 is a flow chart illustrating one method for performing RF antenna tuning in order to enhance a reliability of tuning circuit components within a wireless communication device operating in a wireless network, according to one embodiment.

FIG. 5 illustrates a method for performing RF antenna tuning in order to enhance a reliability of tuning circuit components within a wireless communication device operating in a wireless network. The method of FIG. 5 begins at start block 501 and proceeds to block 502 at which WCD 100/TRE utility 118 receives a request to change a first RF tuning state. The request to change an RF tuning state may be a result of tuning to a new RF channel, activating a corresponding receiver or transmitter, detecting a change in signal level, and/or changing of sensor inputs. At block 504, WCD 100 retrieves component usage data 108 corresponding to one or more tuning circuit components 138 of tuning circuit 136 that is tunable to the first RF operating channel. In a first implementation, the tuning circuit components are voltage tunable components including Barium Strontium Titanate (BST) components. In addition, at block 506, WCD 100 retrieves at least one of (i) device environment state data 110 and (ii) an RF state data 112. The retrieved device environment state data 110 and/or RF state data 112 impacts reliability performance of tuning circuit components when tuning circuit 136 is activated. At block 508, WCD 100 retrieves a component reliability model used to determine reliability performance of tuning circuit components. At block 510, WCD 100 calculates, using component usage data and the identified component reliability model, values for an accumulated component operational wear for the one or more circuit components 138. At block 512, WCD 100 computes, using values for accumulated component operational wear, an updated expected remaining lifetime value for each of the one or more tuning circuit components 138.

At block 514, WCD 100 initiates, using the device environment state and/or the RF state data, and the updated expected remaining lifetime value for each of the one or more tuning circuit components 138, an evaluation to determine an antenna tuning state for tuning circuit 136. The determined antenna tuning state for tuning circuit 136 (a) satisfies tuning performance specifications and (b) enhances component reliability performance by minimizing an operational wear on the one or more tuning circuit components 138. At decision block 516, WCD 100 determines, using a result of the evaluation, whether to perform high performance RF tuning (or lower, acceptable performance RF tuning). If, at decision block 516, WCD 100 makes a determination to perform high performance RF tuning, WCD 100 performs antenna tuning to tune to the first RF operating channel using high performance tuning values, as shown at block 518. If, at decision block 516, WCD 100 does not make a determination to perform high performance RF tuning but instead determines to perform lower acceptable performance RF tuning, WCD 100 performs antenna tuning to tune to the first RF operating channel using lower, acceptable performance tuning values which reduce operational wear, as shown at block 520.

At block 522, WCD 100 tracks session parameter values for an active communication session associated with activation of tuning circuit components 138 to provide RF tuning for the first RF operating channel. The session parameter values include component usage state information 108 for the active communication session. Following completion of the communication session, WCD 100 uses the tracked session parameter values to update component usage data 108 corresponding to tuning circuit components 138, as shown at block 524. In one embodiment, WCD 100 stores component usage data 108 within modem 146. The process ends at block 526.

Figure 6:
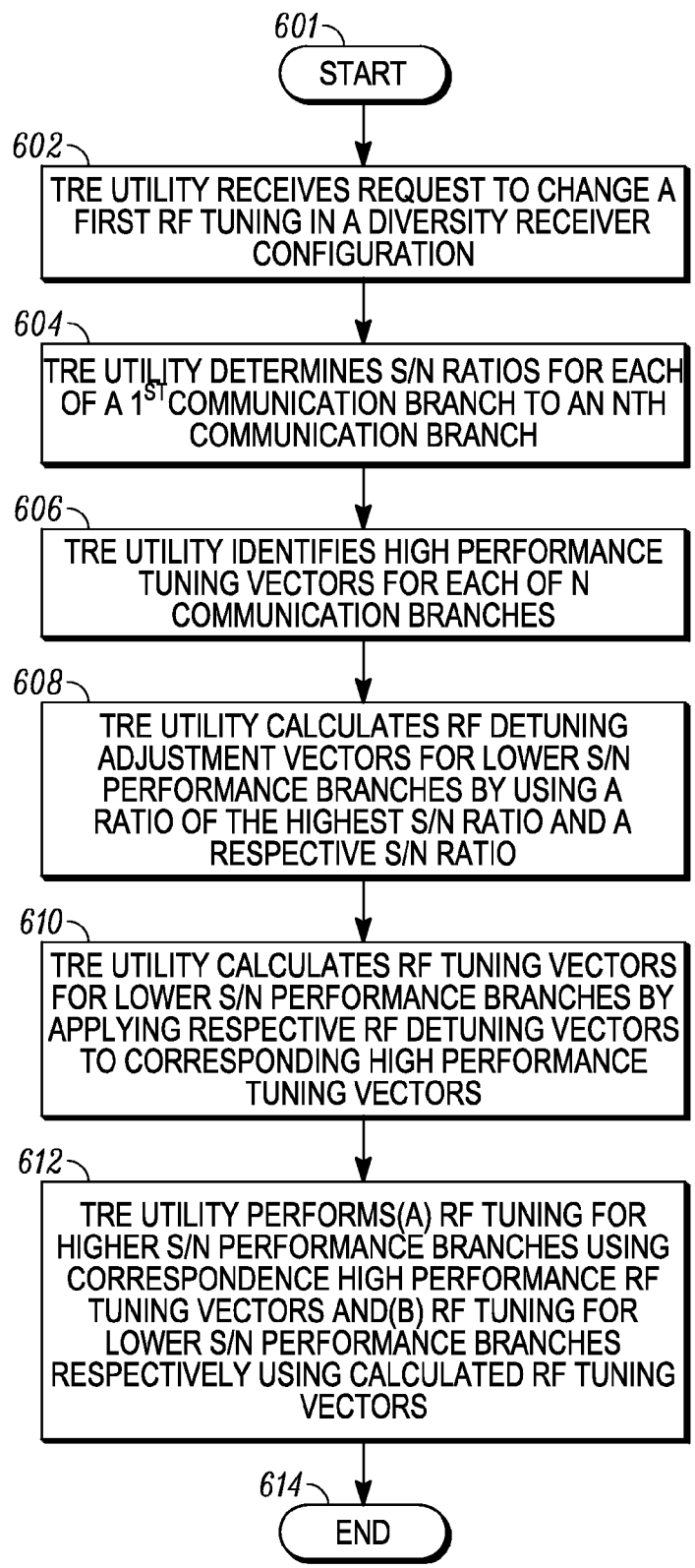
FIG. 6 is a flow chart illustrating one method for performing RF tuning and RF detuning within a diversity receiver configuration of a wireless communication device, according to one embodiment.

FIG. 6 illustrates a method for performing RF tuning and RF detuning within a diversity receiver configuration of a wireless communication device. The method of FIG. 6 begins at start block 601 and proceeds to block 602 at which TRE utility 118 receives a request to change a first RF tuning frequency for a diversity receiver configuration. At block 604, TRE utility 118 determines S/N ratios for each of a first communication branch to an $N^{th}$ communication branch. TRE utility 118 identifies high performance tuning vectors for each of the "N" communication branches, as shown at block 606. TRE utility 118 calculates an RF detuning adjustment vector for as many as N−1 branches, which represent lower S/N performance branches, by using a ratio of the highest S/N ratio and a respective S/N ratio, as shown at block 608. At block 610, TRE utility 118 calculates RF tuning vectors for the lower S/N performance branches by applying respective RF detuning adjustment vectors to corresponding high performance tuning vectors. At block 612, TRE utility 118 performs (a) RF tuning for higher S/N performance branches using corresponding high performance RF tuning vectors and (b) RF tuning for lower S/N performance branches respectively using the calculated RF tuning vectors. In one embodiment, the values for a number of branches within a set of lower S/N performance branches range from 0 to N−1 and the actual number of lower S/N performance branches can be determined by comparing S/N ratios for respective branches with a threshold S/N ratio. In particular, according to one embodiment, WCD 100 identifies a first set of higher S/N performance branches in which each branch has a respective S/N that differs from the highest S/N by less than the threshold S/N ratio. WCD 100 identifies a second, remaining set of lower S/N performance branches in which each branch has a respective S/N that differs from the highest S/N by at least the threshold S/N ratio. The lower S/N performance branches will have tuning settings applied that are sub-optimal with respect to RF performance, but which improve the reliability of the tuner. The process illustrated by the flow chart of FIG. 6 ends at block 614.

Figure 7:
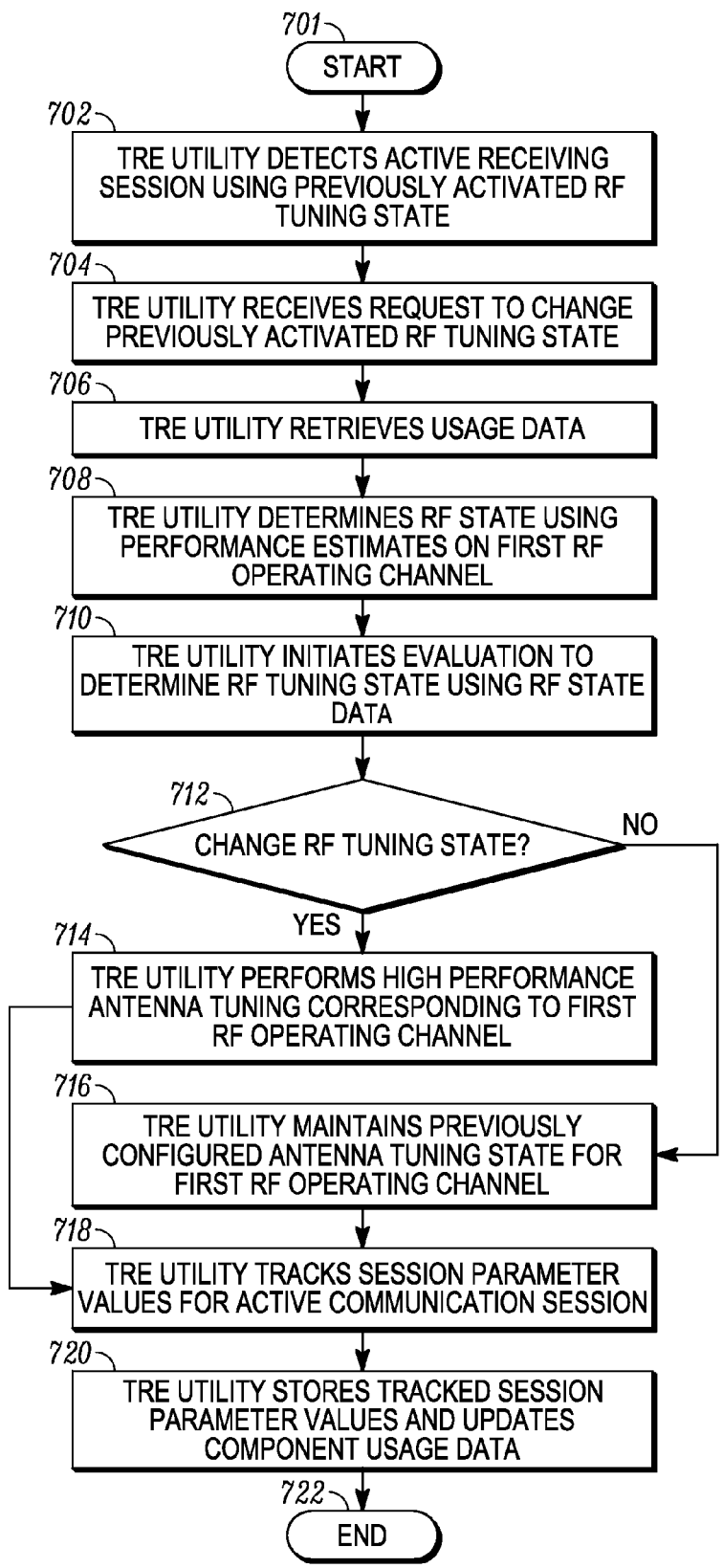
FIG. 7 is a flow chart illustrating one method for performing RF antenna tuning by either changing or maintaining a previously activated tuning state within a wireless communication device, according to one embodiment.

FIG. 7 illustrates a method for performing RF antenna tuning by either changing or maintaining a previously activated tuning state, within a wireless communication device. The method of FIG. 7 begins at start block 701 and proceeds to block 702 at which TRE utility 118 detects an occurrence of an active receiving session using a previously activated RF tuning state for tuning circuit 137. At block 704, TRE utility 118 receives a request to change the first or previously configured RF tuning state. The request to change an RF tuning state may be a result of tuning to a new RF channel, activating a corresponding receiver or transmitter, detecting a change in signal level, and/or changing of sensor inputs. At block 706, TRE utility 118 retrieves component usage data, which includes session parameter values for component actuation count. TRE utility 118 determines an RF state using performance estimates on the first RF operating channel, as shown at block 708. At block 710, TRE utility 118 initiates an evaluation to determine an RF tuning state using the RF state data.

At decision block 712, TRE utility 118 determines whether to change a tuning state of tuning circuit 137 from the previously activated RF tuning state to a high performance tuning state that can minimize antenna match loss when configured within tuning circuit 137 to tune to the first RF operating channel. If at decision block 712 TRE utility 118 makes a determination to change the previously activated RF tuning state, TRE utility 118 performs high performance antenna tuning corresponding to the first RF operating channel, as shown at block 714. However, if at decision block 712 TRE utility 118 does not make a determination to change the previously activated RF tuning state, TRE utility 118 maintains the previously configured antenna tuning state for a communication session corresponding to the first RF operating channel in order to enhance component reliability, as shown at block 716. At block 718, TRE utility 118 tracks session parameter values for an active communication session associated with operation of tuning circuit components 138. The session parameter values include component usage state information 108 for the active communication session. Following completion of the communication session, TRE utility 118 stores the tracked session parameter values as component usage data 108 corresponding to tuning circuit components 138, as shown at block 720. The process ends at block 722.

Figure 8:
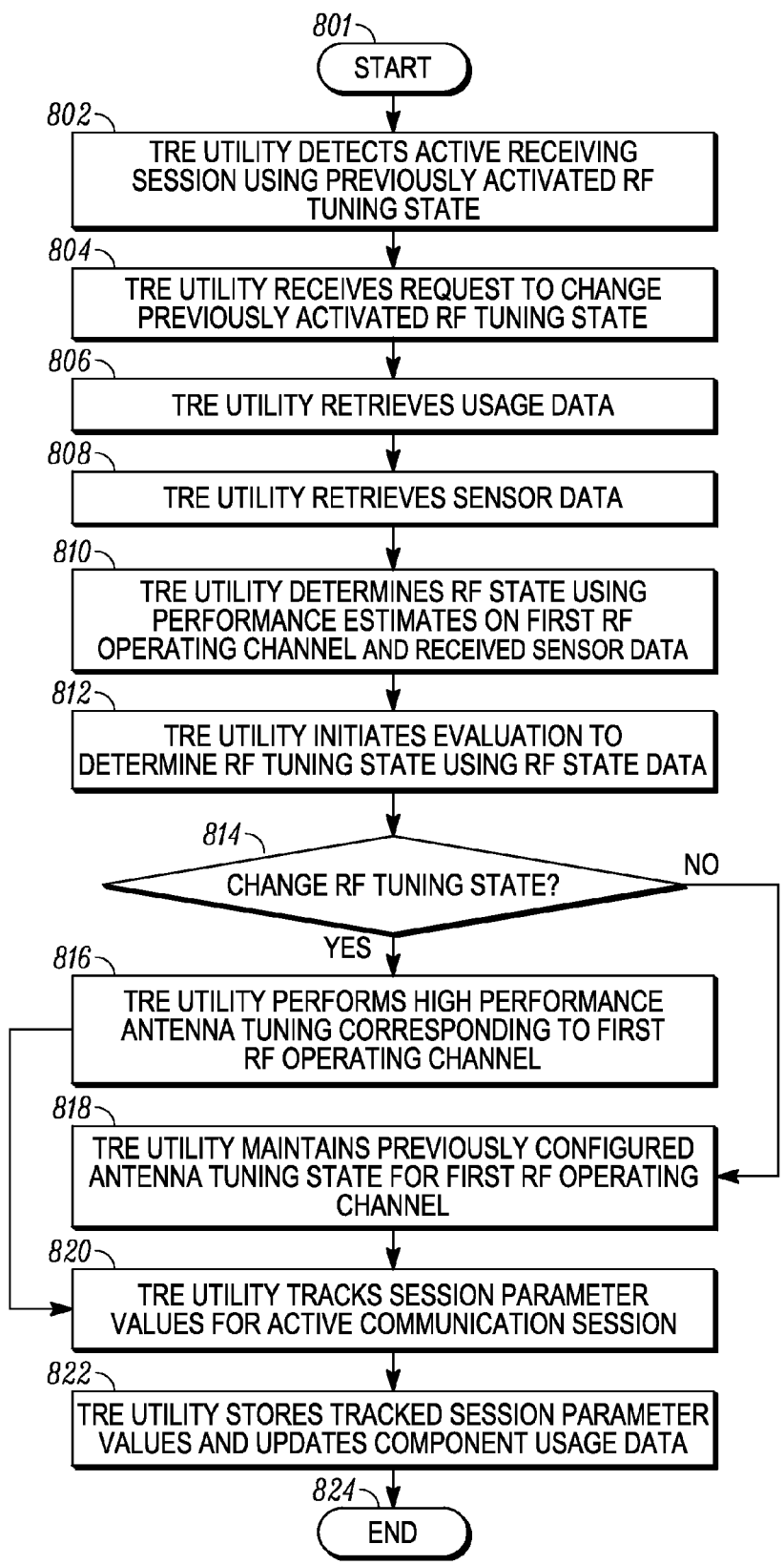
FIG. 8 is a flow chart illustrating one method for performing RF antenna tuning by using received sensor and usage data to determine an RF state and using the RF state to determine whether to change or maintain a previously activated tuning state within a wireless communication device, according to one embodiment.

FIG. 8 illustrates a method for performing RF antenna tuning by using received sensor and usage data to determine an RF state and using the RF state to determine whether to change or maintain a previously activated tuning state, within a wireless communication device. The method of FIG. 8 begins at start block 801 and proceeds to block 802 at which TRE utility 118 detects an occurrence of an active receiving session using a previously activated RF tuning state. At block 804, TRE utility 118 receives a request to change the previously activated RF tuning state. At block 806, TRE utility 118 retrieves component usage data which includes session parameter values for component actuation count. At block 808, TRE utility 118 receives sensor data from one or more sensor devices. At block 810, TRE utility 118 determines an RF state using performance estimates on the first RF operating channel and the received sensor data. At block 812, TRE utility 118 initiates an evaluation to determine an RF tuning state using the RF state data.

At decision block 814, TRE utility 118 determines whether to change the previously activated RF tuning state. If at decision block 814 TRE utility 118 makes a determination to change the previously activated RF tuning state, TRE utility 118 performs high performance antenna tuning corresponding to the first RF operating channel, as shown at block 816. However, if at decision block 814 TRE utility 118 does not make a determination to change the previously activated RF tuning state, TRE utility 118 maintains the previously configured antenna tuning state for a communication session corresponding to the first RF operating channel in order to enhance component reliability, as shown at block 818. At block 820, TRE utility 118 tracks session parameter values for an active communication session associated with operation of tuning circuit components 138. The session parameter values include component usage state information 108 for the active communication session. Following completion of the communication session, TRE utility 118 stores the tracked session parameter values as component usage data 108 corresponding to tuning circuit components 138, as shown at block 822. The process ends at block 824.

Figure 9:
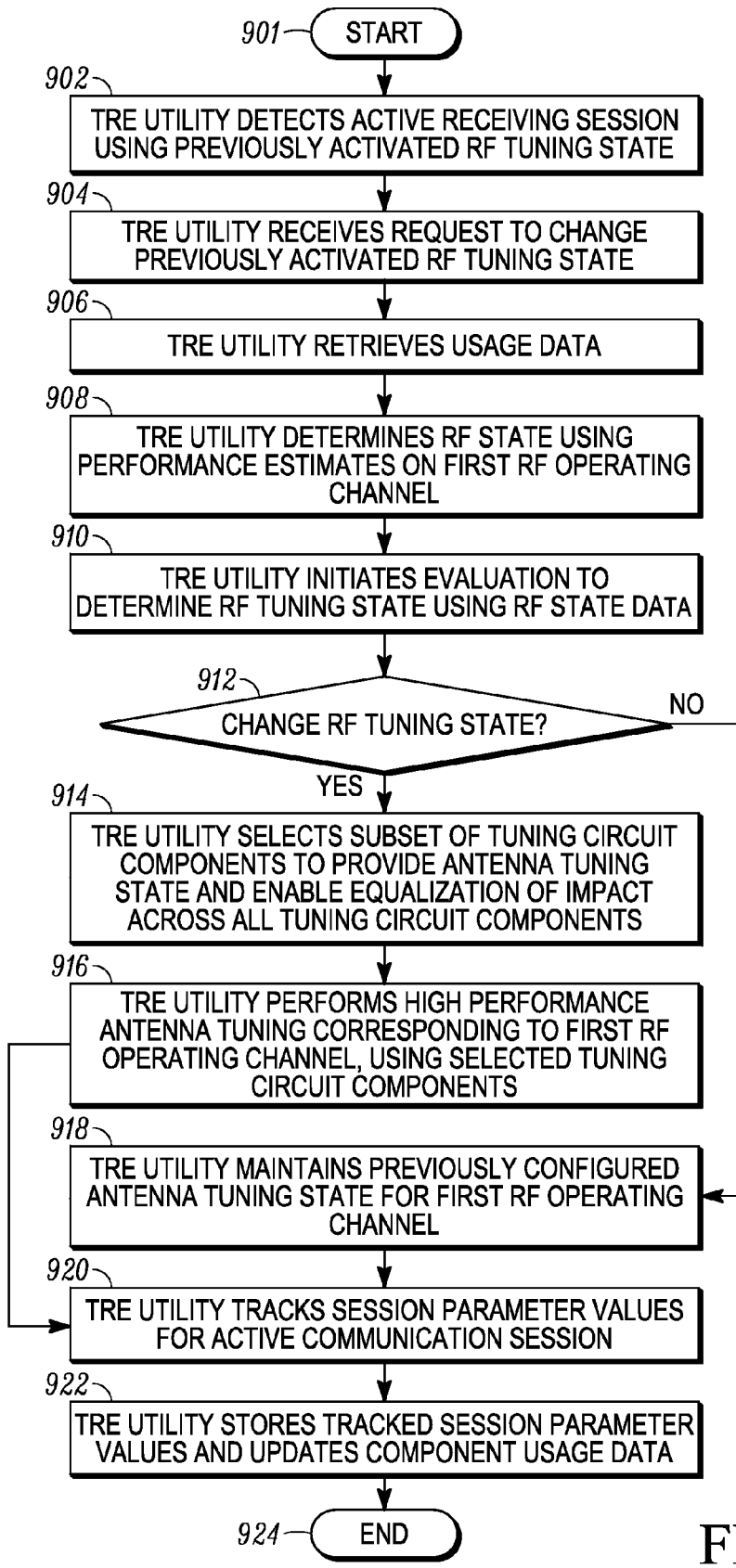
FIG. 9 is a flow chart illustrating one method for performing RF antenna tuning while equalizing an impact to component actuation count across all tuning circuit components within a wireless communication device, according to one embodiment.

FIG. 9 illustrates a method for performing RF antenna tuning while equalizing an impact to component actuation count across all tuning circuit components, within a wireless communication device. The method of FIG. 9 begins at start block 901 and proceeds to block 902 at which TRE utility 118 detects an occurrence of an active receiving session using a previously activated RF tuning state. At block 904, TRE utility 118 receives a request to change the previously activated RF tuning state. At block 906, TRE utility 118 retrieves component usage data, which includes session parameter values for component actuation count. TRE utility 118 determines an RF state using performance estimates on the first RF operating channel, as shown at block 908. At block 910, TRE utility 118 initiates an evaluation to determine an RF tuning state using the RF state data.

At decision block 912, TRE utility 118 determines whether to change the previously activated RF tuning state. If at decision block 912 TRE utility 118 makes a determination to change the previously activated RF tuning state, TRE utility 118 selects a subset of tuning circuit components 138 to provide a corresponding antenna tuning state and to enable an equalization of an impact to component actuation count across all tuning circuit components, as shown at block 914. At block 916, TRE utility 118 performs high performance antenna tuning corresponding to the first RF operating channel, using the selected tuning circuit components. However, if at decision block 912 TRE utility 118 does not make a determination to change the previously activated RF tuning state, TRE utility 118 maintains the previously configured antenna tuning state. TRE utility 118 uses the previously configured antenna tuning state for a communication session corresponding to the first RF operating channel in order to enhance component reliability, as shown at block 918. At block 920, TRE utility 118 tracks session parameter values for an active communication session associated with operation of tuning circuit components 138. The session parameter values include component usage state information 108 for the active communication session. Following completion of the communication session, TRE utility 118 stores the tracked session parameter values as component usage data 108 corresponding to tuning circuit components 138, as shown at block 922. The process ends at block 924.

The flowchart and block diagrams in the various figures presented and described herein illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for performing antenna tuning within a wireless communication device, the method comprising:
receiving a request to change a first radio frequency (RF) tuning state;
retrieving component usage data corresponding to one or more tuning circuit components of a tuning circuit that is tunable to a first RF operating channel associated with the request;
retrieving information about at least one of: a device environment state or an RF state, at least some of the information about the device environment state or the RF state associated with a reliability performance of tuning circuit components when the tuning state is activated;
selectively determining, using the retrieved component usage data and at least some of the information:

an antenna tuning state for the tuning circuit to tune to the first RF operating channel; and which antenna tuning state satisfies tuning performance specifications and enhances component reliability performance by minimizing an operational wear on the one or more tuning circuit components; and performing antenna tuning to tune to the first RF operating channel using the determined antenna tuning state which satisfies performance specifications associated with tuning to the first RF operating channel and enhances component reliability performance by minimizing the operational wear on the one or more tuning circuit components.

2. The method of claim 1, further comprising:

tracking session parameter values associated with activation of the one or more tuning circuit components, the session parameter values including component usage state information for an active communication session that is supported by a corresponding antenna tuning state;

identifying a component reliability model used to determine a respective reliability performance of each of the one or more tuning circuit components;

calculating, using the tracked session parameter values and the identified component reliability model, values for component operational wear caused by the communication session for the one or more tuning circuit components;

calculating, using the values for component operational wear, values for an accumulated component operational wear for the one or more tuning circuit components;

computing, using values for accumulated component operational wear, an updated expected remaining lifetime value for each of the one or more tuning circuit components; and storing the updated remaining lifetime value for each of the one or more tuning circuit components within a data structure.

3. The method of claim 2, wherein:

the tracked session parameter values include a duration of the active communication session and at least one of:

a temperature profile of a corresponding tuning circuit component for the active communication session;

a bias voltage of the corresponding tuning circuit component; or a humidity of the corresponding tuning circuit component.

4. The method of claim 2, wherein said selectively determining further comprises:

identifying a number of parameters associated with channel activation, and which parameters are used, to determine which antenna tuning state is configured, wherein the number of parameters comprises at least one of:

modem communication mode parameter indicating whether a modem associated with wireless communication device is in one of an idle state, a dormant state, or a connected state; or a specified bias voltage parameter for respective tuning circuit components, wherein a value of said specified bias voltage parameter is identifiable based on an assigned modem channel;

determining, using an evaluation incorporating values for the identified parameters, the usage data, and a remaining lifetime value, whether to select a first high performance antenna tuning state;

in response to determining that the first high performance antenna tuning state is selected, initiating antenna tuning using a first set of tuning values that provides a first performance operation of the tuning circuit; and in response to determining that a second lower performance antenna tuning state is selected, initiating antenna tuning using a second set of tuning values that provides an acceptable, lower performance operation of the tuning circuit than the first performance operation while improving component reliability performance by extending a remaining lifetime of at least one of the one or more tuning circuit components.

5. The method of claim 4, further comprising:

preventing an activation of an antenna tuning state configured using the second set of tuning values during at least one restricted interval comprising at least one of:

a first interval of wireless channel acquisition; or a second interval of neighbor cell monitoring.

6. The method of claim 4, further comprising:

in response to determining that the second set of tuning values is selected, selecting parameter values that minimize the operational wear on the one or more tuning circuit components by using one of:

preset detuning adjustments to high performance antenna tuning values; or calculated detuning adjustments to high performance antenna tuning values wherein the detuning adjustments provide an acceptable projected received signal strength.

7. The method of claim 1, further comprising:

identifying high performance tuning vectors for each communication branch from among N communication branches of a diversity communication configuration, including a first set of branches branch initially having higher signal-to-noise ratios (SINs) than a second set of branches initially having lower SIN ratios than the first set of branches, prior to an RF tuning adjustment, wherein the branches are identified in an order based on the respective values of the SIN ratios;

calculating RF tuning vectors for each branch within the second set of branches by applying, using a ratio of a highest SIN ratio and a respective SIN ratio, an RF detuning adjustment vector to a high performance tuning vector identified for a respective branch;

performing RF tuning for each branch within the first set of branches using an identified high performance RF tuning vector corresponding to each branch within the first set of branches; and performing respective RF tuning for branches within the second set of branches using the calculated RF tuning vectors.

8. The method of claim 1, wherein said determining further comprises:

determining whether to perform antenna tuning based on:

an estimation of an expected RF state of the first RF operating channel; and whether the first RF operating channel is included within an acceptable range of an RF bandwidth corresponding to RF tuning for a previously activated RF channel.

9. The method of claim 8, wherein:

the tuning circuit comprises electro-mechanical components which, when activated, trigger one or more actuations;

the component usage data includes information indicating at least one of an estimated count and an overall count of component actuations associated with changing of RF states over previous communication sessions; and component reliability performance is improved by minimizing an increase rate of a count of actuations of the electro-mechanical components.

10. The method of claim 9, wherein said determining further comprises:
in response to the expected RF state indicating a high RF signal strength, maintaining a first tuning state corresponding to the previously activated RF channel in order to improve component reliability in response to the RF operating channel being included within the acceptable range of the RF bandwidth corresponding to the previously activated RF channel.

11. The method of claim 10, wherein said determining further comprises:
identifying a trend of the expected RF state corresponding to the RF operating channel; and
in response to the trend of the expected RF state indicating static RF conditions, maintaining a first RF tuning state corresponding to the previously activated RF channel in order to improve component reliability.

12. The method of claim 11, wherein said determining further comprises:
receiving sensor data from at least one sensor, wherein the at least one sensor can include one of an accelerometer, a capacitive touch sensor, and a proximity sensor;
detecting, using the received sensor data, at least one of a movement of the wireless communication device or movement of objects near the wireless communication device, wherein the received sensor data is used to identify the RF state;
determining the trend of expected signal strength by analyzing at least one of the received sensor data.

13. The method of claim 9, wherein said determining further comprises:
determining whether to change from a first tuning state to a second tuning state based on an estimated remaining lifetime of the one or more tuning circuit components, wherein the estimated remaining lifetime is based, at least in part, upon the overall count of actuations performed by the electro-mechanical components of the one or more tuning circuit components.

14. The method of claim 9, further comprising:
identifying a remaining lifetime value for each tuning circuit component of the one or more tuning circuit components, wherein at least one tuning circuit component is randomly selected to contribute to a specified tuning state which is provided by a first subset of tuning circuit components of the one or more tuning circuit components;
selecting, from among functional tuning circuit components of the one or more tuning circuit components and, based on the identified remaining lifetime value, a second subset of tuning circuit components of the one or more tuning circuit components that are activated to contribute to a total capacitance corresponding to a specified antenna tuning state; and
distributing an impact caused by component operational wear to remaining lifetime values across the one or more tuning circuit components, while configuring specified antenna tuning states by activating different selected subsets of the one or more tuning circuit components for various communication sessions.

15. The method of claim 9, further comprising:
determining, using a device usage level for RF communication activity, whether to maintain a first tuning state, instead of switching to a second tuning state, wherein a high usage level is correlated with a high overall count of component actuations if the second tuning state is activated over corresponding communication sessions, wherein the first tuning state is maintained more frequently for the high usage level than for a low usage level based on a ratio of the high usage level and a threshold usage level.

16. A wireless communication device comprising:
at least one processor;
at least one RF transceiver;
at least one modem configured to be communicatively coupled to the RF transceiver;
at least one tuning circuit communicatively coupled to the at least one modem; and
a utility that, when executed by the at least one processor, configures the wireless communication device to:
receive a request to change a first radio frequency (RF) tuning state;
retrieve component usage data corresponding to one or more tuning circuit components of a tuning circuit that is tunable to a first RF operating channel associated with the request;
retrieve information about at least one of: a device environment state or an RF state, the at least one device environment state or RF state impacting a selection of a tuning state that enhances reliability performance of tuning circuit components when the tuning state is activated;
selectively determine, using the retrieved component usage data and the retrieved information:
one or more antenna tuning states for tuning the tuning circuit to the first RF operating channel; and
which antenna tuning state of the one or more antenna tuning states satisfies tuning performance specifications and enhances component reliability performance by minimizing an operational wear on the one or more tuning circuit components; and
perform antenna tuning to tune the tuning circuit to the first RF operating channel using the antenna tuning state which satisfies tuning performance specifications associated with tuning to the first RF operating channel and enhances component reliability performance by minimizing the operational wear on the one or more tuning circuit components.

17. The wireless communication device of claim 16, wherein the utility further configures the wireless communication device to:
track session parameter values associated with activation of the one or more tuning circuit components, the session parameter values including component usage state information for an active communication session that is supported by a corresponding antenna tuning state;
identify a component reliability model used to determine a respective reliability performance of each of the one or more tuning circuit components;
calculate, using the tracked session parameter values and the identified component reliability model, values for component operational wear caused by the communication session for the one or more tuning circuit components;
calculate, using the values for component operational wear, values for an accumulated component operational wear for the one or more tuning circuit components;
compute, using values for accumulated component operational wear, an updated expected remaining lifetime value for each of the one or more tuning circuit components; and store the updated remaining lifetime value for each of the one or more tuning circuit components within a data structure.

18. The wireless communication device of claim 17, wherein:
the tracked session parameter values include a duration of the active communication session and at least one of:
a temperature profile of a corresponding tuning circuit component for the communication session;
a bias voltage of the corresponding tuning circuit component; or
a humidity of the corresponding tuning circuit component.

19. The wireless communication device of claim 17, wherein the utility further configures the wireless communication device to:
identify a number of parameters associated with channel activation, and which parameters are used, to determine which antenna tuning state is configured, wherein the number of parameters comprises at least one of:
modem communication mode parameter indicating whether the at least one modem is in one of an idle state, a dormant state, or a connected state; or
a specified bias voltage parameter for respective tuning circuit components, wherein a value of said specified bias voltage parameter is identifiable based on an assigned modem channel;
determine, using an evaluation incorporating values for the identified parameters, the usage data, and a remaining lifetime value, whether to select a first high performance antenna tuning state;
in response to determining that the first high performance antenna tuning state is selected, initiate antenna tuning using a first set of tuning values that provides a first performance operation of the tuning circuit; and
in response to determining that a second lower performance antenna tuning state is selected, initiate antenna tuning using a second set of tuning values that provides an acceptable, lower performance operation of the tuning circuit than the first performance operation while improving component reliability performance by extending a remaining lifetime of at least one of the one or more tuning circuit components.

20. The wireless communication device of claim 19, wherein the utility further configures the wireless communication device to:
prevent an activation of an antenna tuning state configured using the second set of tuning values during at least one restricted interval comprising at least one of:
a first interval of wireless channel acquisition; or
a second interval of neighbor cell monitoring.

21. The wireless communication device of claim 20, wherein the utility further configures the wireless communication device to:
in response to determining that the second set of tuning values is selected, select parameter values that minimize the operational wear on the one or more tuning circuit components by using one of:
preset detuning adjustments to high performance antenna tuning values; and
calculated detuning adjustments to high performance antenna tuning values,
wherein the detuning adjustments provide an acceptable projected received signal strength.

22. The wireless communication device of claim 16, wherein the utility further configures the wireless communication device to:
identify high performance tuning vectors for each communication branch from among N communication branches of a diversity communication configuration, including a first set of branches branch initially having higher signal-to-noise ratios (SINs) than a second set of branches initially having lower SIN ratios that the first set of branches, prior to an RF tuning adjustment, wherein the branches are identified in an order based on the respective values of the SIN ratios;
calculate RF tuning vectors for each branch within the second set of branches by applying, using a ratio of a highest SIN ratio and a respective SIN ratio, an RF detuning adjustment vector to a high performance tuning vector identified for a respective branch;
perform RF tuning for each branch within the first set of branches using an identified high performance RF tuning vector corresponding to each branch within the first set of branches; and
perform respective RF tuning for branches within the second set of branches using the calculated RF tuning vectors.

23. The wireless communication device of claim 16, wherein the utility further configures the wireless communication device to:
determine whether to perform antenna tuning based on:
an estimation of an expected RF state of the RF operating channel; and
whether the RF operating channel is included within an acceptable range of an RF bandwidth corresponding to RF tuning for a previously activated RF channel.

24. The wireless communication device of claim 23, wherein:
the tuning circuit comprises electro-mechanical components which when activated trigger one or more actuations;
the component usage data includes information indicating an overall count of component actuations associated with changing of RF states over previous communication sessions; and
component reliability performance is improved by minimizing an increase rate of count of actuations of the electro-mechanical components.

25. The wireless communication device of claim 24, wherein the utility further configures the wireless communication device to:
in response to the expected RF state indicating a high RF signal strength, maintain a first tuning state corresponding to the previously activated RF channel in order to improve component reliability response to the RF operating channel being included within the acceptable range of the RF bandwidth corresponding to the previously activated RF channel.

26. The wireless communication device of claim 24, wherein the utility further configures the wireless communication device to:
identify a trend of the expected RF state corresponding to the RF operating channel; and
in response to the trend of the expected RF state indicating static RF conditions, maintain a first RF tuning state corresponding to the previously activated RF channel in order to improve component reliability.

27. The wireless communication device of claim 26, wherein the utility further configures the wireless communication device to:
receive sensor data from at least one sensor, wherein the at least one sensor can include one of an accelerometer, a capacitive touch sensor, and a proximity sensor;

detect, using the received sensor data, at least one of a movement of the wireless communication device or movement of objects near the wireless communication device, wherein the received sensor data is used to identify the RF state;

determine the trend of expected signal strength by analyzing the received sensor data.

28. The wireless communication device of claim 24, wherein the utility further configures the wireless communication device to:

determine whether to change from a first tuning state to a second tuning state based on an estimated remaining lifetime of the one or more tuning circuit components, wherein the estimated remaining lifetime is based, at least in part, upon the overall count of actuations performed by the electro-mechanical components of the one or more tuning circuit components.

29. The wireless communication device of claim 24, wherein the utility further configures the wireless communication device to:

identify a remaining lifetime value for each tuning circuit component of the one or more tuning circuit components, wherein at least one tuning circuit component is randomly selected to contribute to a specified tuning state which is provided by a first subset of tuning circuit components of the one or more tuning circuit components;

select, from among functional tuning circuit components of the one or more tuning circuit components and, based on the identified remaining lifetime value, a second subset of tuning circuit components that are activated to contribute to a total capacitance corresponding to a specified antenna tuning state; and distribute an impact caused by component operational wear to remaining lifetime values across the one or more tuning circuit components, while configuring specified antenna tuning states by activating different selected subsets of the one or more tuning circuit components for various communication sessions.

30. The wireless communication device of claim 24, wherein the utility further configures the wireless communication device to:

determine, using a device usage level for RF communication activity, whether to maintain a first tuning state, instead of switching to a second tuning state, wherein a high usage level is correlated with a high overall count of component actuations if the second tuning state is activated over corresponding communication sessions, wherein the first tuning state is maintained more frequently for the high usage level than for a low usage level based on a ratio of the high usage level and a threshold usage level.

* * * * *